United States Patent [19]

Lowe et al.

[11] Patent Number: 5,075,088

[45] Date of Patent: Dec. 24, 1991

[54] PRODUCTION OF RED PHOSPHORUS

[75] Inventors: Edward J. Lowe; William S. Holmes, both of West Midlands, England

[73] Assignee: Albright & Wilson Limited, Oldbury, Warley, West Midlands, England

[21] Appl. No.: 616,749

[22] Filed: Nov. 19, 1990

Related U.S. Application Data

[63] Continuation of Ser. No. 507,011, Apr. 10, 1990, abandoned, which is a continuation of Ser. No. 395,141, Aug. 16, 1989, abandoned, which is a continuation of Ser. No. 279,283, Nov. 30, 1988, abandoned, which is a continuation of Ser. No. 129,246, Dec. 7, 1987, abandoned.

[30] Foreign Application Priority Data

Dec. 8, 1986 [GB] United Kingdom ................. 8629285

[51] Int. Cl.$^5$ ...................... C01B 25/01; C01B 25/02; C01B 25/04
[52] U.S. Cl. .................................... 423/322; 423/323

[58] Field of Search ................................ 423/322, 323

[56] References Cited

U.S. PATENT DOCUMENTS 3,207,583 9/1965 Brautigam et al. ................. 423/322
3,998,931 12/1976 Hyman et al. ...................... 423/322
4,188,367 2/1980 McGilvery .......................... 423/322

Primary Examiner—Gregory A. Heller
Attorney, Agent, or Firm—Frishauf, Holtz, Goodman & Woodward

[57] ABSTRACT

Amorphous red phosphorus useful for matches, or as flame retardant is made by forming a slurry of 10–45% red phosphorus in molten white phosphorus, reducing the content of yellow phosphorus to less than 20% of the red phosphorus by separation at less than 280° C., and then heating the product at above 295° C. to convert, and preferably also evaporate, the white phosphorus.

24 Claims, No Drawings

PRODUCTION OF RED PHOSPHORUS

This application is a continuation of application Ser. No. 07/507,011 filed Apr. 10, 1990 (abandoned); which is a continuation of Ser. No. 07/395,141 filed Aug. 16, 1989 (abandoned); which is a continuation of Ser. No. 07/279,283 filed Nov. 30, 1988 (abandoned); which is a continuation of Ser. No. 07/129,246 filed Dec. 7, 1987 (abandoned).

BACKGROUND OF THE INVENTION

1. Field of the Invention

The present invention relates to novel processes for the production of red phosphorus and the novel products of that process.

2. Background Information

Red phosphorus may be produced from white phosphorus by maintaining the white phosphorus at an elevated temperature which is usually in the range 220° to 280° C. Conventional processes for the production of red phosphorus utilise lengthy reaction times in order to convert the white phosphorus to red phosphorus as completely as possible. Such procedures can be operated as batch processes and produce a brittle form of red phosphorus which must be chipped out of the reaction vessel and ground in a mill. The product may contain residual unconverted white phosphorus which constitutes a fire risk when the product is exposed to the atmosphere. It is then necessary to treat the product with alkali in order to remove the white phosphorus.

The production of red phosphorus from a slurry of red phosphorus in molten white phosphorus by sweeping the slurry with inert gas at temperatures above 200° C. so as to volatilise the white phosphorus, has been described by P. Miller, R. A. Wilson and J. R. Tusson in Industrial and Engineering Chemistry Volume 40 (1948) p 357 to 366. Such procedures offer clear advantages when compared to the conventional processes in that they can be operated on a continuous basis, but are complicated by the difficulties of completely separating the white phosphorus and the red phosphorus in a manner which avoids the deposition of solid red phosphorus in the processing equipment. Miller, Wilson and Tusson state that centrifuging the slurry was not effective and that vacuum distillation of the slurry was not satisfactory because of the difficulty in removing the last traces of white phosphorus from the residual red phosphorus.

In U.S. Pat. No. 3,998,931 Hyman and Chase describe a process for the production of a slurry of red phosphorus in white phosphorus which they state is useful in the production of red phosphorus. However, no indication whatever is given as to the method by which the red phosphorus is to be separated from the white phosphorus.

SUMMARY OF THE INVENTION

We have now discovered that a stable red phosphorus product can be produced from a slurry of red phosphorus in white phosphorus by a process comprising the separation of the majority of the white phosphorus from the red phosphorus under conditions such that little or no white phosphorus is converted to red phosphorus and subsequently processing the resulting mixture of white and red phosphorus under controlled conditions until the white phosphorus content has been reduced to an acceptable level.

Accordingly from one aspect our invention provides a process for the production of red amorphous phosphorus which comprises the steps of:

(i) forming a slurry of red phosphorus in molten white phosphorus which slurry comprises from 10 to 45% by weight of red phosphorus;

(ii) separating white phosphorus from the slurry whilst maintaining the slurry at a temperature of less than 280° C. until the amount of white phosphorus present is less than 20% of the weight of red phosphorus;

(iii) heating the red phosphorus product to a temperature above 295° C. so as to convert at least some white phosphorus to red phosphorus to leave a red amorphous phosphorus product.

Preferably in step (iii) the heating is under vacuum to evaporate at least some of the white phosphorus. Thus preferably the temperature and pressure applied to the phosphorus in that step are at a level such that white phosphorus is evaporated.

Surprisingly the conversion and preferred evaporation of the residual white phosphorus in step (iii) does not cause the red phosphorus to bind together to produce a brittle material. The red phosphorus product is friable and easily handled and does not necessarily require washing with caustic soda to obtain the desired degree of stability.

The red phosphorus produced by this process can be made up of substantially uniform spherical particles. The actual size and the particle size distribution vary according to the conditions under which the slurry of red phosphorus in white phosphorus is produced.

DETAILED DESCRIPTION OF THE INVENTION

The slurry of red phosphorus in white phosphorus may be produced by conventional methods used to heat white phosphorus to a temperature in the range 230° to 280° C. using, e.g. the apparatus and techniques described in U.S. Pat. Nos. 2,397,951 and 3,998,931. The conversion is performed with agitation e.g. by stirring the white phosphorus uniformly and preferably with uniform heat transfer to avoid hot spots. The rate of conversion of white to red phosphorus increases with temperature and normally the temperature of the phosphorus will be maintained in the range 260° to 275° C. in order to achieve acceptably rapid conversion. The rate of conversion must be monitored in order to avoid the solidification of the slurry as the proportion of red phosphorus increases. As the degree of conversion approaches 50% solidification becomes almost inevitable even if the slurry is agitated in a highly efficient manner and we thus prefer to continue heating until the slurry comprises from 10 to 45 preferably from 15 to 35% and especially 18–25% by weight of red phosphorus (based on the total weight of phosphorus).

The separation of the white phosphorus from the slurry is then preferably carried out by transferring the slurry to an evaporator. Although the slurry can be heated so as to commence the evaporation of the white phosphorus at this stage, such a procedure is disadvantageous in view of the energy required to evaporate the white phosphorus. We prefer to first allow the slurry to cool after it is introduced into the evaporator. The slurry should preferably be allowed to cool to a temperature in the range 150° to 200° C. The slurry separates into a lower portion comprising a concentrated slurry of red phosphorus in white phosphorus and a supernatent mother liquor of liquid white phosphorus of greatly reduced phosphorus content. This supernatent liquor can be removed and returned to the convertor. The concentrated slurry layer remaining in the evaporator preferably comprises from 40 to 50% by weight of red phosphorus and from 60 to 50% by weight of white phosphorus.

Preferably the processes of steps (i), (ii) and/or (iii) are performed in the absence of applied compressive forces e.g. as result from milling or grinding, but between steps (i) and (ii) the particle size of the red phosphorus in the slurry of step (i) can be reduced e.g. by milling of the slurry with abrading material under inert conditions such as in a bead mill with alumina beads. After the particle size reduction the abrading material is separated under inert conditions.

The bulk of the white phosphorus in the slurry from step (i), optionally after concentration and/or particle size reduction, such as described above may then be removed from the residual slurry by evaporation. The evaporation is usually performed under reduced pressure in a vessel whose contents are agitated, preferably uniformly. It is important that this operation be effected under such conditions that the degree of conversion of white phosphorus to red does not cause the residue to solidify into a brittle mass and preferably is under conditions causing no substantial increase in particle size of the red phosphorus.

The degree of conversion is preferably controlled by control of the temperature of the phosphorus. We prefer to maintain that temperature at a value of less than 250° C. e.g. 150°–230° C. and especially 150°–200° C. and pressures of e.g. 100–500 mm Hg e.g. 100–250 mm; thus temperatures can be less than 250° C. which requires the application of a sub-atmospheric pressure of about 400 mm Hg or 220° C. at 200 mm and about 186° C. at 150 mm Hg. The initial evaporation can less preferably be carried out at higher pressures and at correspondingly higher temperature but the pressure and temperature must be reduced before the risk of solidification of the slurry increases to an unacceptable level. In the preferred embodiment the pressure may be progressively reduced from an initial figure of about 400 mm Hg to a level preferably in the range 0.2 to 200 mm when white phosphorus is evaporated at temperatures of 45° to 210° C. Alternatively the pressure may be essentially constant with the white phosphorus distilling off. The evaporated white phosphorus is condensed and recycled for reuse e.g. in step (i). The white phosphorus content of the red phosphorus product is reduced in step (ii) to less than 20% and preferably less than 10% e.g. 1–10% and especially can be reduced to a level of from 1.0 to 5.0% by weight of the red phosphorus under these conditions. A rise in the temperature of the phosphorus to a value above the boiling point of white phosphorus at the prevailing pressure indicates that there is essentially no further easily volatilizable white phosphorus present. At this stage the separation step (ii) of the process is preferably terminated. The temperature can then be increased for step (iii).

In step (iii) the proportion of white phosphorus should preferably be reduced to a level of from 0 to 150 ppm and preferably less than 50 ppm of the red phosphorus in order to produce a product having the preferred degree of stability. The reduction in the proportion of white phosphorus may be achieved in step (iii) by converting the white phosphorus to red phosphorus alone or in addition by evaporating some of it as well under reduced pressure. The procedure is preferably carried out by raising the temperature of the red phosphorus to a value in the range 295° to 360° C. e.g. 300°–330° C. and maintaining that temperature for a period of from 1.0 to 0.5 hours, the shorter times referring to the higher temperatures. The maximum temperature to which the red phosphorus is raised is preferably that at which its vapour pressure is equal to the pressure applied to it. It is therefore preferable to control the pressure applied to the phosphorus at this stage of the process. In general this pressure will be maintained in the range 49 mm Hg to 330 mm Hg.

It is preferable that steps are taken to ensure that conditions in the evaporator are as uniform as possible in one and especially both of steps (ii) and (iii). The heating elements should be arranged so as to ensure that the entire mass of the phosphorus reaches the desired temperature and the phosphorus particles are preferably agitated so as to assist in this objective by improving the rate of diffusion and heat transfer. It is also possible to assist the evaporation of white phosphorus in either or both of steps (ii) and (iii) of the process by sweeping the vapour space above the phosphorus with an inert gas such as nitrogen. At the end of the process of step (iii) the phosphorus is preferably allowed to cool to a temperature of less than about 270° C. e.g. less than about 260° C. before the vacuum is released e.g. by addition of inert gas. The white phosphorus content of this material may be as low as 50 ppm e.g. 10–50 ppm such as 25 or 16 ppm. Such products are usually more stable than conventional amorphous phosphorus which has been treated with alkali in order to remove white phosphorus.

The red phosphorus product of step (iii) can easily be discharged as a readily flowable powder from the evaporator to a storage drum. The red phosphorus product may be further stabilised by the addition of conventional stabilisers such as magnesium oxide, aluminium hydroxide or titanium oxide. It may also be coated with organic coating agents such as are known in the art, e.g. hydrocarbon oils or waxes and non-ionic surfactants or polymers. The red phosphorus product may be used in matches or for flame retarding organic polymers.

The invention is illustrated by the following examples:

EXAMPLE 1

Under an atmosphere of inert gas, nitrogen, 170 kg. of white phosphorus were heated for approximately six hours at a temperature of about 270° C. in a stirred vessel to convert some of the white phosphorus to red phosphorus. The vessel contents, comprising a slurry of 36 kg. red phosphorus and 134 kg. of white phosphorus, then quickly cooled to 150° C. The 170 kg. of slurry from the converter were then transferred under inert gas atmosphere to a second vessel (the evaporator). The atmosphere in the evaporator was rendered inert before and after transfer of the slurry by a small nitrogen purge. The evaporator was heated by means of electrical radiant heaters and fitted with an agitator which was used to agitate the contents throughout their time in this vessel.

After transfer of the slurry the pressure in the evaporator was reduced to about 150 mm Hg and the evaporator contents heated, while still at approximately 150 mm Hg, to about 186° C. when white phosphorus began to boil off. The pressure was maintained fairly constant at about 150 mm Hg, in the heated evaporator so the contents' temperature remained fairly constant at 186°

C. as the white phosphorus boiled off. The white phosphorus vapour coming from the evaporator was condensed. After about 3.8 hrs. at approximately 186° C. and a pressure of 150 mm the evaporator contents' temperature started to rise, indicating that a majority of the white phosphorus had been boiled off. The phosphorus product contained about 2% white phosphorus.

The heating was kept on the evaporator and the pressure upon its contents maintained at about 150 mm Hg. The temperature of the evaporator contents was then allowed to rise so that the maximum temperature achieved by the product was 313° C. and the time for which the product temperature was above 310° C. was about one hour. The product was then allowed to cool while still under about 150 mm Hg pressure to approximately 265° C. and then the pressure brought up to atmospheric (760 mm) with nitrogen. 36 kg. of red phosphorus were removed from the evaporator as a readily flowable powder. It had a median particle size of 15 microns and the white phosphorus content was 25 ppm. 134 kg. of white phosphorus were collected from the condenser.

EXAMPLE 2

The process of Example 1 was repeated with a milling stage between steps (i) and (ii). The slurry of red phosphorus in white phosphorus from step (i) was passed into bead mill where it was ground with alumina beads to reduce its particle size. The ground slurry was then separated from the beads and passed to the evaporator for step (ii). The red phosphorus product from step (iii) had a median particle size of 9 microns and a white phosphorus content of 20 ppm.

What we claim is:

1. A process for the production of friable red amorphous phosphorus
    from a slurry of red phosphorus in molten white phosphorus, which slurry comprises 10 to 45% by weight of red phosphorus, which process comprises
    (i) separating white phosphorus from the slurry of red phosphorus, whilst maintaining the slurry at a temperature of less than 280° C. until the amount of white phosphorus present in the red phosphorus product obtained is less than 20% of the total weight of the red phosphorus, and
    (ii) heating the red phosphorus product to a temperature above 295° C. under conditions to convert at least some white phosphorus to red phosphorus to leave a friable red amorphous phosphorus product.

2. The process according to claim 1 wherein in step (ii) the heating is under vacuum to evaporate at least some of the white phosphorus.

3. The process according to claim 2 wherein in step (ii) the red phosphorus product is heated at 295°-360° C. under vacuum.

4. The process according to claim 3, wherein in step (ii) the red phosphorus product is heated at a temperature of 300° to 330° C. for a period of 1.0 to 0.5 hours.

5. The process according to claim 3 wherein after step (ii) the red amorphous product is allowed to cool to below 270° C. under vacuum.

6. The process according to claim 5, wherein after step (ii) the red amorphous product is allowed to cool to below 260° C. under vacuum.

7. A process according to claim 5 in which the red amorphous phosphorus product contains less than 50 ppm white phosphorus.

8. The process according to claim 7 wherein step (i) is performed by evaporation of white phosphorus from the slurry at less than 250° C. under vacuum.

9. The process according to claim 8 wherein step (i) is performed at 150°-200° C.

10. The process according to claim 8, wherein step (i) is performed at a pressure of 100 to 250 mm Hg.

11. The process according to claim 9 wherein step (i) is performed until the content of white phosphorus in the red phosphorus product is less than 10%.

12. The process according to claim 11 wherein the content of white phosphorus in the product of step (i) is 1-5%.

13. The process according to claim 12 wherein the slurry contains 15-35% red phosphorus.

14. The process according to claim 13 wherein the slurry contains 18-25% red phosphorus.

15. The process according to claim 14 wherein the slurry is produced by heating phosphorus at 260°-280° C. with stirring.

16. The process according to claim 15 wherein the particle size of the red phosphorus in the slurry is reduced prior to step (i) by milling.

17. The process according to claim 1 wherein after step (ii) the red amorphous product is allowed to cool to below 270° C. under vacuum.

18. A process according to claim 1 in which the red amorphous phosphorus product contains less than 50 ppm white phosphorus.

19. The process according to claim 1 wherein step (i) is performed by evaporation of white phosphorus from the slurry at less than 250° C. under vacuum.

20. The process according to claim 1 wherein step (i) is performed until the content of white phosphorus in the red phosphorus product is less than 10%.

21. The process according to claim 1 wherein the slurry contains 15-35% red phosphorus.

22. The process according to claim 1 wherein the slurry is produced by heating phosphorus at 260°-280° C. with stirring.

23. The process according to claim 1 wherein the particle size of the red phosphorus in the slurry is reduced prior to step (i) by milling.

24. Amorphous red phosphorus produced by a process as claimed in claim 1.

* * * * *